Aug. 26, 1969   E. W. BROEKER ET AL   3,463,278
TRANSMISSION AND BRAKE FOR CABLE DRUM WITH MODULATING VALVE
Filed Nov. 2, 1967                                2 Sheets-Sheet 1
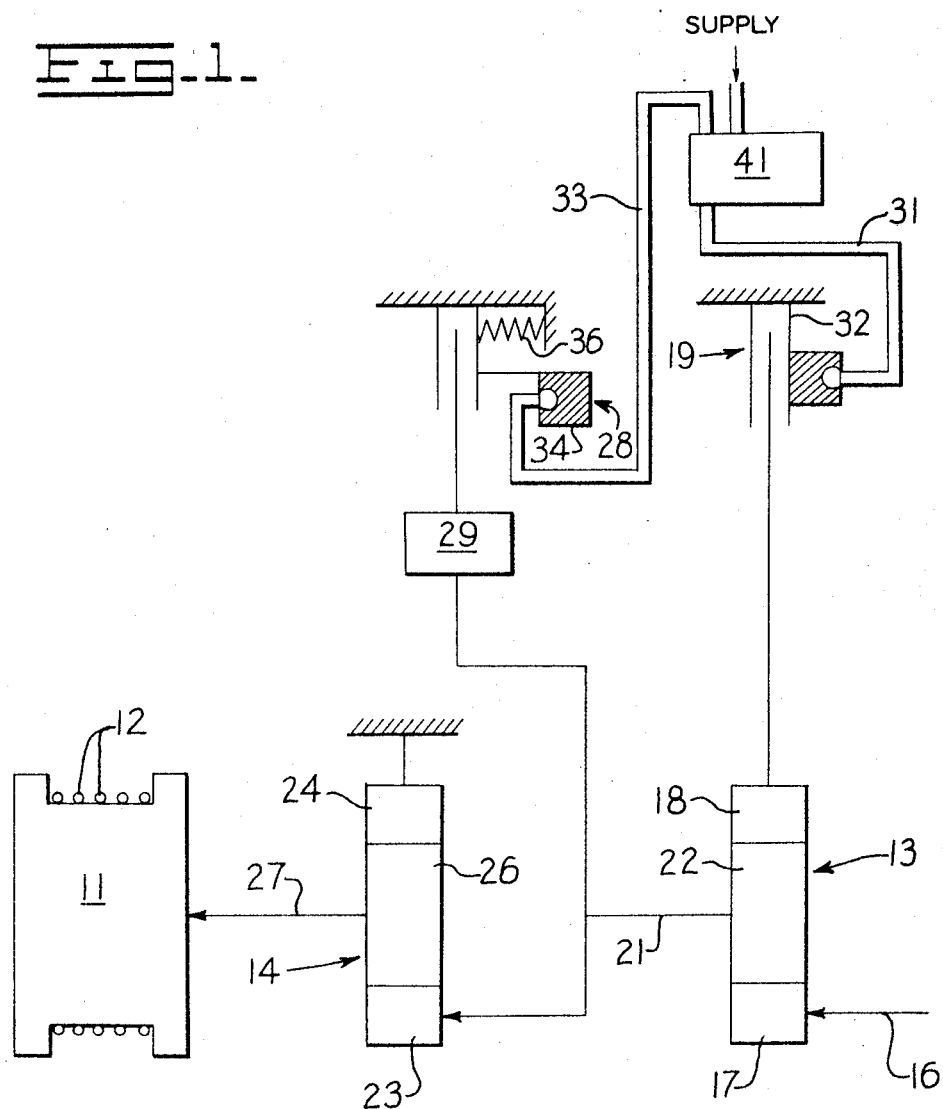
INVENTORS
ELMER W. BROEKER
SHAIRYL I. PEARCE
GERALD D. ROHWEDER
BY
ATTORNEYS

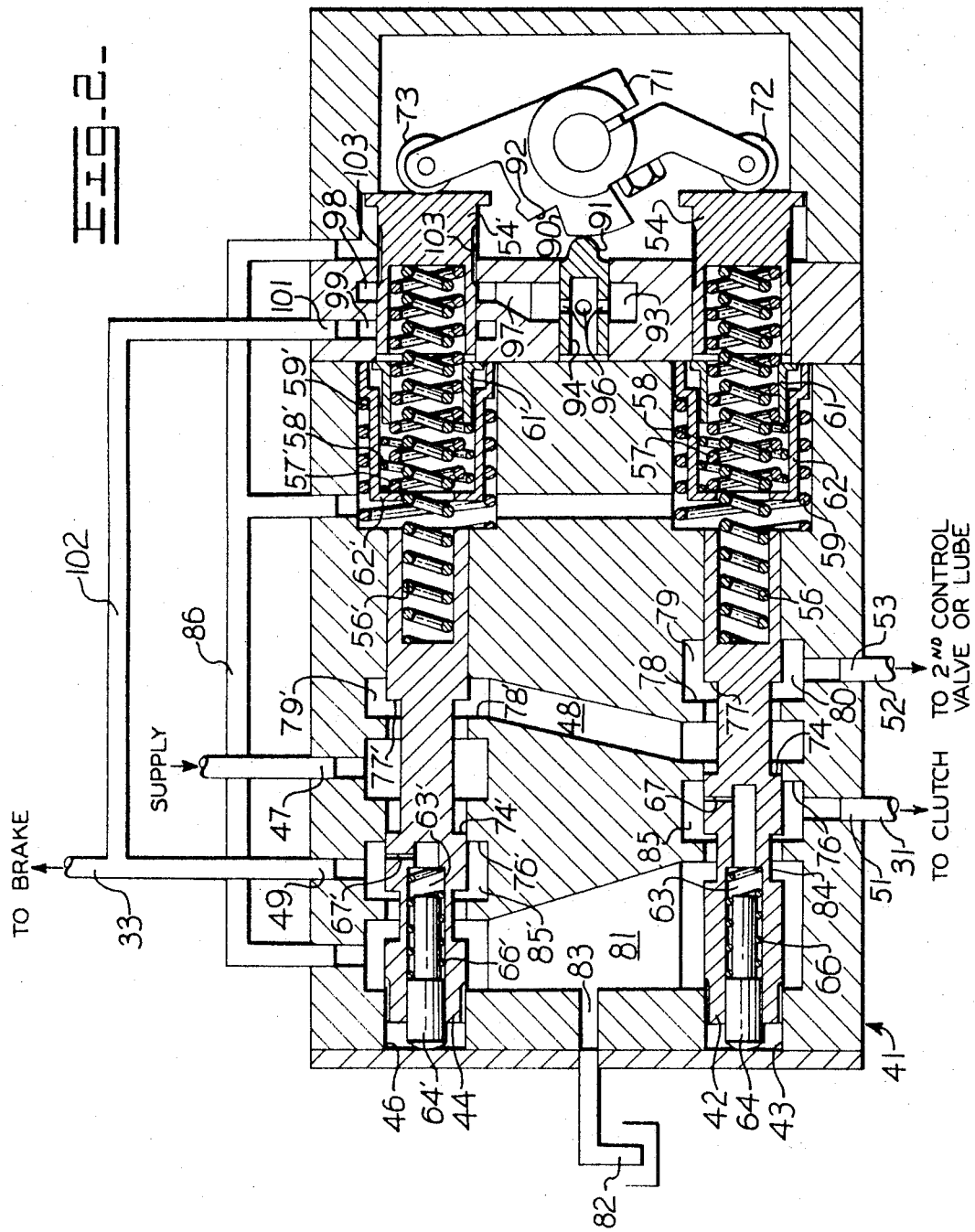

United States Patent Office 3,463,278
Patented Aug. 26, 1969

3,463,278
TRANSMISSION AND BRAKE FOR CABLE DRUM WITH MODULATING VALVE
Elmer W. Broeker, Washington, Shairyl I. Pearce, East Peoria, and Gerald D. Rohweder, Peoria, Ill., assignors to Caterpillar Tractor Co., Peoria, Ill., a corporation of California
Filed Nov. 2, 1967, Ser. No. 680,085
Int. Cl. F16d 67/00
U.S. Cl. 192—4                          4 Claims

ABSTRACT OF THE DISCLOSURE

A pressure modulating valve for controlling flow of hydraulic fluid to a brake within a clutch assembly of a cable control unit where fluid pressure actuates engagement of a clutch assembly or brake release for winding in or reeling out, respectively, of cable on a drum. The valve includes a manually operated spool which has a nested captive spring assembly for resisting manual operation. Spring resistance for the spool is generally proportional to clutch assembly pressurization and provides a pressure step when disengagement of the clutch assembly is commenced and a second pressure step upon reaching cable overload conditions. A similar valve is associated with the brake and has a detent mechanism for lockout of the brake in a released condition.

---

The present invention relates to a control valve for a hydraulically powered cable control unit of a type having a clutch assembly and brake for controlling a cable drum. In a typical unit of this type, the drum is rotated in one direction to reel out cable, rotated in the opposite direction to wind in cable or locked in place to prevent cable motion. Winding in of the cable is accomplished by engagement of a clutch assembly in the cable control unit. A normally engaged brake in the cable control unit locks the drum to prevent reeling out of cable. The brake is released to permit reeling out for example by gravity.

Since the unit is hydraulically operated, it is difficult for the operator to determine when clutch engagement or brake release commences as well as the amount of clutch or brake pressurization. It is known in the prior art to employ control valves in such arrangements which provide operator "feel" according to the hydraulic pressure acting on a clutch, for example, through the valve. With such system the operator may "inch" the cable for closely controlled motion.

Even with such a unit, however, it is difficult for a normally skilled operator to detect when clutch engagement commences. Moreover, such units are often capable of exerting force greater than the strength of the cable. It is also difficult for the operator to determine at what point clutch pressurization exerts a driving force on the drum which exceeds safe limits for the cable. Accordingly, excessive clutch pressurization may result in undesirable cable breakage.

The present invention overcomes this problem by providing a manually operated, pressure modulating valve for controlling fluid flow to the clutch assembly and having a plurality of captive springs. Preferably a similar valve and captive springs are also provided for controlling fluid flow to the brake. The spring assembly for the clutch control valve performs three functions. It proportionally resists manual operation of the lever. It provides a first force step when clutch engagement commences and it provides a second force step when clutch pressurization starts to overload the cable.

It is accordingly an object of the present invention to provide a control valve of the type described immediately above for controlling fluid flow to actuate a cable control unit clutch assembly. In addition to permitting precise motion control over the cable, the operator is notified by the pressure steps when clutch engagement commences and when cable overload conditions arise. He may further increase clutch pressurization if necessary but only with the knowledge that cable breakage may result.

It is a further object to provide a similar control valve for the cable control unit brake to provide for operator notification upon commencement of brake release and upon full brake release.

It is a still further object to incorporate a detent mechanism to lock the brake in its released position and permit free-wheeling of the drum while the operator is away from his station.

Other objects and advantages of the present invention are made apparent in the following description and the accompanying drawings wherein:

FIG. 1 is a schematic representation of an exemplary cable control unit, and

FIG. 2 is a central sectional view of a valve for controlling fluid flow to the cable control unit clutch and brake.

The present control valve is preferably for association with at least one cable control unit which controls a cable drum mounted for example on a tractor to operate implements associated with the tractor. A standard double drum unit would require a second cable control unit and control valve for the second drum. Since the control unit and valve for each drum would be similar, only one is described below.

An exemplary cable control unit is illustrated in FIG. 1 for controlling a cable drum 11 containing cable 12. The drum is driven through first and second planetary gear sets 13 and 14 respectively from a drive shaft 16. The drive shaft is connected to a sun gear 17 of the first planetary set which has a normally free rotating ring gear 18. A brake 19 forms a clutch or coupling assembly with the first ring gear 18 so that engagement of the brake locks the ring gear from rotation. A carrier 21 supports planet gears 22 of the first planetary gear set 13 and is connected to a sun gear 23 of the second planetary gear set. The second planetary gear set has a grounded ring gear 24 and planet gears 26 supported by a carrier 27 which is connected to the cable drum 11. With the brake 19 normally disengaged, as in neutral, the first ring gear is free to rotate and no power is transmitted from the drive shaft to the first carrier or provided to the drum. When brake 19 is engaged, the first ring gear is grounded. The first carrier drives the second planetary gear set which further reduces rotational drive speed and rotates the cable drum in one direction, for example, clockwise, to wind in cable. When the cable is employed to control elevation of a load such as a scraper bowl (not shown), the drum will tend to rotate counterclockwise under the influence of gravity to reel out cable and lower the load. To hold the load in neutral when the brake 19 is disengaged, a normally engaged brake 28 is associated with the connection between the first planet carrier and the second sun gear. Energy to be expended by the brake in stopping or holding the drum is reduced by the second planetary gear set. Brake 28 is held in a released position to permit counterclockwise rotation of the drum and reeling out of the cable. To permit winding in of cable by engagement of brake 19, an overrunning clutch 29 is interposed between the brake 28 and the interconnection of the two planetary gear sets. The overrunning clutch permits the drum to be driven in a clockwise or winding-in direction but prevents free rotation of the drum in a counterclockwise or reeling-out direction when brake 19 is disengaged unless the normally engaged brake 28 is released.

To engage brake 19, fluid is provided in a conduit 31 which communicates with a pressure plate 32 of the clutch. Another conduit 33 communicates fluid to a pressure plate 34 in the brake 28. However, fluid pressure in conduit 33 urges the pressure plate 34 against a spring 36, which disengages the clutch, so that the normally engaged brake 28 is released. A valve 41 controls fluid flow to both the clutch and the brake through conduits 31 and 33 respectively.

The control valve 41, as shown in FIG. 2, has a pressure modulating valve spool 42 disposed for longitudinal motion in a bore 43 to control fluid flow through conduit 31 to the clutch assembly brake 19. The control valve has a similar pressure modulating valve spool 44 disposed for longitudinal motion in a bore 46 to control fluid flow through conduit 33 to the brake 28. Fluid under pressure is supplied to the modulating valve for the brake 28 by means of an inlet passage 47. An internal passage 48 interconnects the bores 46 and 43 so that fluid from the inlet passage 47 may pass through the modulating valve for the brake to the modulating valve for the clutch. The valve bore 46 is communicated to the brake conduit 33 through a port 49 while the valve bore 43 is communicated to the clutch conduit 31 by means of a port 51. The bore 43 is also in communication with a lubrication conduit 52 by means of a port 53. The lubrication conduit provides a constant back pressure of, for example, 30 pounds per square inch. A second duct valve similar to valve 41 could be placed across conduit 52 to control a second cable control unit.

To first describe the valve portion associated with the clutch, a load piston 54 is disposed at the right end of the bore 43 with a metering spring 56 interacting between the load piston and the modulating valve spool 42. A nested arrangement of captive springs 57, 58 and 59 together with first and second spring retainers 61 and 62 respectively interact with the load piston 54, the valve housing 41, and with each other to provide force steps, in a manner described below, which are communicated to the operator through a control lever described below. The modulating valve spool 42 has an axial bore 63 at its left end to receive a slug 64, a spring 66 is disposed in the bore 63 to interact with the slug and urge it leftwardly against the end of the bore 43. A passage 67 is defined by the modulating valve spool 42 to communicate the bore 63 with the bore 43 in a manner described below. The modulating valve spool 44, for brake control, has similar associated components as those described above for the clutch controlling portion of the valve. These similar components are indicated by the same numeral with a prime mark to indicate their association with the modulating valve spool 44.

A rotatable actuating lever 71 is disposed at the right end of the control valve housing 41 and has rollers 72 and 73 to interact with the load pistons 54 and 54' respectively. The actuating lever is suitable for manual operation. Clockwise rotation of the actuating lever, from the position shown, urges the load piston 54 leftwardly into bore 43 to commence actuation of the clutch. Counterclockwise rotation of the actuating lever urges the load piston 54' leftwardly into bore 46 to commence actuation of the brake release function.

To engage the brake 19, leftward motion of the load piston 54 in response to clockwise rotation of the lever 71 is transmitted to the modulating valve spool 42 through the metering spring 56. The left end of the load piston is normally spaced apart from the first spring retainer 61 so that the first spring 58, which interacts between the first and second spring retainers, is unaffected by initial motion of the load piston. The spring 57 which interacts between the second spring retainer and the load piston is also compressed upon initial leftward motion of the load piston. Initial leftward motion of the modulating valve spool 42 is resisted only by the light spring 66 at the left end thereof. Thus, as the load piston 54 moves leftwardly into contact with the first spring retainer 61, the modulating valve spool 42 is also urged leftwardly by the metering spring 56. At this point, a land 74 defined by the spool 42 is in line with the right edge of an annular recess 85 defined by the spool bore 43. The annular recess 85 is in communication with the clutch outlet port 51. Any additional leftward shifting of the spool 42 will result in fluid passing from passage 48 into bore 43, between land 74 and an annular edge 76 and into port 51 to commence pressurization of the clutch. However, this additional leftward movement of the spool 42 according to the load piston 54 is also resisted by the first spring 58 which now acts upon the load piston through the first spring retainer. The strength of the spring 58 is selected such that an additional pressure increment, of, for example, 2½ pounds must be exerted through the actuating lever to continue leftward shifting of the spool 42. This pressure increment or step of 2½ pounds provides notice to the operator that continued clockwise motion of the lever 71 will commence pressurization of the clutch.

Upon continued clockwise rotation of the lever 71, the spool 42 functions as a reducing valve to meter fluid between land 74 and annular edge 76 until fluid pressure in the conduit 31 rises to the back pressure normally existing in conduit 52. Continued leftward shifting of the spool 42 from this position terminates its function as a pressure modulating reducing valve, since metering is no longer taking place between the land 74 and the annular edge 76. Rather, another land 77 cooperates with a left edge 78 of an annular groove 79, defined by the spool bore 43 to be in communication with the lubrication outlet port 53, to commence metering of fluid flow from the passage 48 into the lubrication conduit 52. Metering between the land 77 and the annular edge 78 serves to raise the fluid pressure which exists in passage 48 and passes to the brake 19 so that the valve spool 42 acts as a pressure modulating relief valve. During this transitional stage of the modulating valve spool, the first spring retainer 61 is shifted leftwardly along with the load piston 54. Also during modulated pressure increase in brake 19 above normal back pressure, an overload range is reached above which the clutch assembly brake 19 exerts greater force than the normal safe operating limits for the cable. The strengths of the various springs are selected so that the first spring retainer 61 moves leftwardly into contact with the second spring retainer 62 just as pressurization commences to enter the cable overload range. Thus, continued leftward movement of the load piston is also resisted by the second spring 59 which acts against the load piston through both the first and second spring retainers. The strength of second spring 59 is selected so that a force step of 5 lbs., for example, must be additionally exerted upon the load piston through the control lever to further increase clutch pressurization. This force step serves as a notice to the operator that continued pressurization will exceed safe operating limits for the cable.

To insure that pressure in brake 19 drops to zero when the control lever is again rotated counterclockwise, the left end of the spool bore 43, as well as the left end of the spool bore 46, is in communication with an internal chamber 81 which is in turn communicated to a fluid drain 82 by means of a port 83 in the valve housing 41. Prior to pressurization of brake 19, an annular groove 84 is defined by the modulating valve spool 42 to communicate the annular recess 85 to drain through the chamber 81. Upon initial leftward shifting of the valve spool 42, the annular groove 84 passes out of communication with the annular recess 85. However, as clutch pressure rises in the annular recess 85, it is communicated into the axial spool bore 63 by the passage 67. Thus, actuating fluid pressure in bore 63 is added to the force exerted by the spring 66 to urge the valve spool 42 rightwardly. When the actuating lever 71 is rotated counterclockwise to terminate clutch pressurization, this pressure in bore 63 cannot immediately drain through the orifice 67 and insures that the spool 42 is shifted rightwardly to communicate the clutch to drain through the annular recess 85 and the annular groove 84.

Pressurization to release the brake occurs in a similar manner upon counterclockwise rotation of the actuating lever 71 against the load piston 54'. To describe this function briefly, land 74' and annular edge 76' commence to meter fluid to the brake only after the load piston 54' comes in contact with the first spring retainer 61'. A first force step occurs at this point from the additive effect of the spring 58' against the load piston 54' through the first spring retainer 61'. When land 77' and annular edge 78' commence to meter and raise brake pressure above the normal back pressure in passage 48, the valve spool 44 commences to function as a pressure modultaing relief valve. When pressure communicated into conduit 33 is sufficient to fully release the brake, the first spring retainer 61' comes into contact with the second spring retainer 62'. Thus, the second force step caused by the additive effect of the spring 59' against the load piston 54' is a signal to the operator of full brake release.

However, unlike the valve portion controlling the clutch, the valve portion associated with the brake incorporates a detent mechanism which permits the operator to lock the brake 28 in its release position so that he may dismount from his station and free wheel the cable drum when desired. A drain conduit 86, in communication with the chamber 81, also communicates with the nested spring assemblies as well as with the right end of the housing 41 so that the right end of the load piston 54' is in communication with drain. The detent mechanism comprises a detent piston 91 slidably disposed in the valve housing 41 to extend and engage a notch 92 in the actuating lever when it is suitably positioned for full brake release. The housing 41 defines an annular chamber 93 about the detent piston. The detent piston has an axial bore 94 at its left end and cross-drilled passages 96 which communicate the axial bore 94 with the annular chamber 93. The annular chamber 93 is communicated to the right end of the bore 46 adjacent the load piston 54' by means of a passage 97 and an annular recess 98 in the bore 46. The bore 46 defines another annular recess 99 which is to the left of the annular recess 98 and is communicated to the brake conduit 33 by means of a port 101 and a branch conduit 102.

When the actuating lever 71 is rotated counterclockwise and fluid is provided to the brake, the fluid passes through the branch conduit 102 and the port 101 into the annular recess 99. The load piston 54' has a series of axial slots 103 which provide intercommunication between the annular recesses 98 and 99 when the load piston is shifted leftwardly. The slots 103 communicate the annular recess 98 to the drain conduit 86 by means of the right end of the valve housing 41 when the load piston 54' is in its normal rightward position. Accordingly, when the load piston is shifted leftwardly for brake release, brake actuating fluid in the annular recess 99 is communicated by the slots 103 into the annular recess 98 and into the detent piston bore 94 by means of the passage 97 and the cross-drilled passages 96 in the detent piston. Fluid pressure in the bore 94 urges the detent piston rightwardly so that when the actuating lever 71 is rotated slightly past full brake release, the detent piston engages the notch 92 on the actuating lever and locks the controls with the brakes released. When the operator desires to return the brake to its normally engaged condition, he rotates the actuating lever clockwise so that the detent piston is shifted leftwardly by a ramp surface 90 of the notch 92 and is thus disengaged from the actuating lever.

We claim:

1. In a control valve assembly for controlling hydraulic fluid flow to a hydraulic brake of a clutch assembly in a cable control unit, the combination comprising:
   a pressure modulating valve spool positionable in a valve housing bore to regulate the fluid flow to engage the brake,
   load means which are manually positionable relative to said pressure modulating valve spool,
   metering spring means interposed between said load means and said pressure modulating spool to suitably position said spool according to the position of the load means,
   first spring means disposed in the valve assembly to commence resisting movement of said load means upon positioning of said spool to commence pressurization of the brake, and
   second spring means disposed in the valve assembly to commence resisting movement of said load means upon positioning of said spool to provide a preselected fluid pressure level in the brake, said metering and first and second spring means forming a nested spring assembly in the valve housing between said pressure modulating valve spool and said load means, said first spring means being interposed between first and second slidable spring retainers, said first spring retainer normally resting in spaced apart relation from said load means, said second spring retainer normally resting in spaced apart relation from said first spring retainer with said second spring means being interposed between the valve housing and the second slidable spring retainer.

2. The combination of claim 1 wherein the cable control unit is of a type having a first normally disengaged brake in a clutch assembly and a second normally engaged brake for controlling a cable drum, the first brake to be engaged for winding in cable on the drum, the second brake to be released to permit reeling out of cable from the drum, the control valve assembly further comprising a similar control valve assembly for controlling fluid flow for releasing the second brake.

3. The combination of claim 1 wherein the housing defines a fluid inlet port, outlet port to the brake and another outlet port normally in communication with the inlet port, all three ports communicating with the valve bore, said spool to commence metering fluid flow into the outlet port to the brake after said load means engages said first spring retainer, said spool to thereafter meter fluid flow into the other outlet port to raise fluid pressure in the outlet port to the brake to a maximum safe operating value upon engagement of said second spring retainer by said first spring retainer.

4. The combination of claim 3 wherein the cable control unit also has a second normally engaged brake for controlling a cable drum and wherein
   the housing has another similar control valve assembly for the second brake, said other outlet port for the second brake valve communicating with the inlet port for the first brake valve, said second brake valve spool to commence metering fluid flow to the outlet port to the second brake after its load means engages its first spring retainer, said second brake valve spool to thereafter meter fluid flow into its other outlet port to increase fluid pressure in the outlet port to the second brake to completely release the second brake upon engagement of is second spring retainer by its first spring retainer,
   said first brake valve load means and said second brake valve load means are positionable by a common rotatable actuating lever, and said second brake valve including detent means disposed for cooperation with the actuating lever, said detent operable by fluid pressure communicated to the second brake to lock the actuating lever with said second brake valve load means in a suitable position for full second brake release.

References Cited

UNITED STATES PATENTS

| | | | | |
|---|---|---|---|---|
| 1,566,111 | 12/1925 | Miller | | 192—12.1 |
| 2,615,355 | 10/1952 | Friedman | | 192—17.1 XR |
| 2,725,890 | 12/1955 | Kanuck | | 192—12.1 XR |
| 2,734,609 | 2/1956 | Fritzsch | | 192—18.1 XR |
| 3,306,408 | 2/1967 | Kahle. | | |
| 3,351,169 | 11/1967 | McIndoe | | 192—85 |

BENJAMIN W. WYCHE III, Primary Examiner

U.S. Cl. X.R.

74—785; 137—595; 188—265; 192—109, 18; 254—187; 303—6